US008898008B2

(12) United States Patent
Li

(10) Patent No.: US 8,898,008 B2
(45) Date of Patent: Nov. 25, 2014

(54) NAVIGATION SYSTEM WITH RELATIVE RANKING MECHANISM AND METHOD OF OPERATION THEREOF

(75) Inventor: Daqing Li, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 996 days.

(21) Appl. No.: 12/620,894

(22) Filed: Nov. 18, 2009

(65) Prior Publication Data

US 2011/0118978 A1   May 19, 2011

(51) Int. Cl.
*G01C 21/00* (2006.01)
*G01C 21/36* (2006.01)

(52) U.S. Cl.
CPC ................ *G01C 21/3679* (2013.01)
USPC .................... 701/438; 455/457

(58) Field of Classification Search
USPC ......... 701/400, 426, 430, 431, 438, 451, 454, 701/462; 340/988, 995.1, 995.19; 455/456.1, 456.2, 457
See application file for complete search history.

(56) References Cited

U.S. PATENT DOCUMENTS

| | | | |
|---|---|---|---|
| 6,647,383 B1 | 11/2003 | August et al. | |
| 7,406,448 B2 | 7/2008 | Leberknight | |
| 7,565,155 B2* | 7/2009 | Sheha et al. | 455/456.1 |
| 8,014,939 B2* | 9/2011 | Sheha et al. | 701/426 |
| 8,126,779 B2* | 2/2012 | Wanker | 705/26.1 |
| 2002/0052674 A1 | 5/2002 | Chang et al. | |
| 2002/0120519 A1 | 8/2002 | Martin et al. | |
| 2003/0074209 A1 | 4/2003 | Tobin | |
| 2005/0075119 A1 | 4/2005 | Sheha et al. | |
| 2007/0061057 A1 | 3/2007 | Huang et al. | |
| 2007/0290039 A1 | 12/2007 | Pfleging et al. | |
| 2008/0167812 A1* | 7/2008 | Geelen | 701/213 |
| 2009/0019402 A1 | 1/2009 | Ke et al. | |

* cited by examiner

*Primary Examiner* — Dalena Tran
(74) *Attorney, Agent, or Firm* — IP Investment Law Group

(57) ABSTRACT

A method of operation of a navigation system includes: selecting a category of interest; receiving available information for the category of interest; and extrapolating a relative ranking based on the available information for displaying at a device.

20 Claims, 8 Drawing Sheets

NAVIGATION SYSTEM WITH RELATIVE RANKING MECHANISM AND METHOD OF OPERATION THEREOF

CROSS-REFERENCE TO RELATED APPLICATION(S)

The present application contains subject matter related to a concurrently filed International (PCT) Application by Daqing Li entitled "NAVIGATION SYSTEM WITH RELATIVE RANKING MECHANISM AND METHOD OF OPERATION THEREOF". The related application is assigned to TeleNav, Inc. and is identified by docket number 59-034-PCT. The subject matter thereof is incorporated herein by reference thereto.

TECHNICAL FIELD

The present invention relates generally to a navigation system, and more particularly to a system for navigation system with a relative ranking mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, relative ranking of information that fails to incorporate changes have become a paramount concern for consumers. Inconsistent coverage and unavailability of data decrease the quality of accuracy.

Thus, a need still remains for a navigation system that can generate a relative ranking with more accuracy. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: selecting a category of interest; receiving available information for the category of interest; and extrapolating a relative ranking based on the available information for displaying at a device.

The present invention provides a navigation system including: a user interface for selecting a category of interest; a storage unit, coupled to the user interface, for receiving available information for the category of interest; and a control unit, coupled to the storage unit, for extrapolating a relative ranking based on the available information for displaying at a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
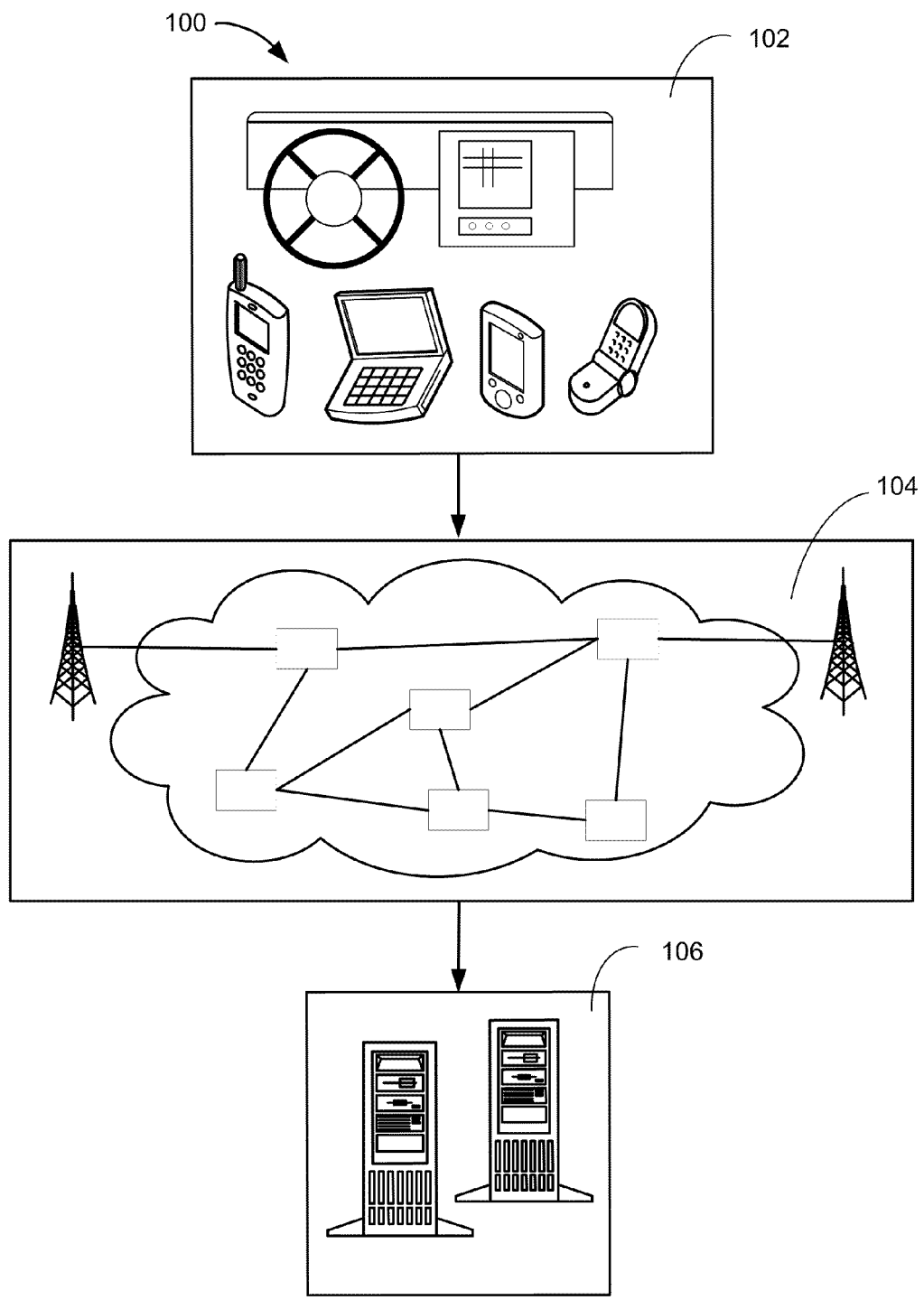
FIG. 1 is a navigation system with relative ranking mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with relative ranking mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can include a variety of communication types and protocols. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
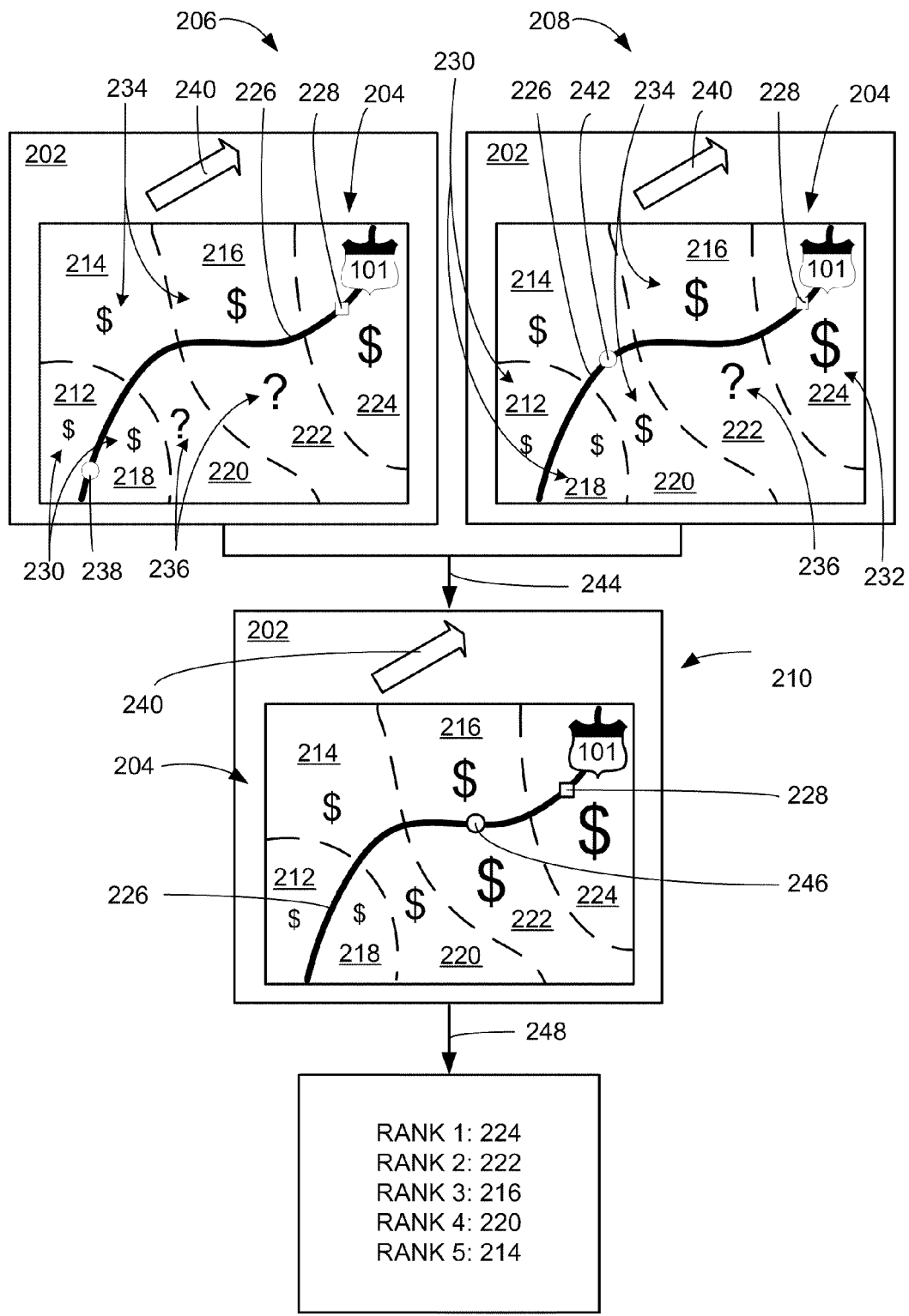
FIG. 2 shows examples of displays in the navigation system of FIG. 1.

Referring now to FIG. 2, therein is shown display examples of the navigation system 100 of FIG. 1. A display interface 202 of the first device 102 of FIG. 1 can depict a region 204 at a past time of interest 206, at a current time of interest 208, and at a future time of interest 210.

The region 204 can include a first sub-region 212, a second sub-region 214, a third sub-region 216, a fourth sub-region 218, a fifth sub-region 220, a sixth sub-region 222, and a seventh sub-region 224. The region 204 can include a route 226. The route 226 can indicate the path a user takes to reach a target destination 228. Some of the sub-regions can represent rural regions 230 while others can represent a metropolitan region 232.

For example, the target destination 228 can be within or near the metropolitan region 232. The metropolitan region 232 can include the seventh sub-region 224. The rural regions 230 can be along the route 226 and further from the target destination 228. The rural regions 230 can include the first sub-region 212 and the fourth sub-region 218.

The rural regions 230 can represent sub-regions where information is scant. The scantiness can represent the lack of information available or the inconsistency in availability of the data. The metropolitan region 232 can include sub-regions where the information is most abundant. The information can be abundant where full data or significantly populated data is available.

At the past time of interest 206, the display interface 202 can display past information for the region 204. For example, the display interface 202 can represent the past price information of the refueling stations in the region 204. The display interface 202 can also display known regions 234 and unknown regions 236.

The known regions 234 can be the sub-regions of the region 204 where the information is available. Some of the sub-regions in the known regions 234 can represent the rural regions 230. For example, the "$" sign can indicate that the price information for fuel price is available. The unknown regions 236 can be the sub-regions of the region 204 where information is unavailable. For example, the "?" mark can indicate that the price information is unavailable. The number of the known regions 234 and the unknown regions 236 can be different at different points in time.

At the past time of interest 206, the display interface 202 can depict the fifth sub-region 220 and the sixth sub-region 222 as the unknown regions 236. The known regions 234 can be the first sub-region 212, the second sub-region 214, the third sub-region 216, the fourth sub-region 218, and the seventh sub-region 224 at the past time of interest 206. A past location 238 can indicate user's geographical location along the route 226 at the past time of interest 206.

The price information for each of the known regions 234 are depicted by the "$" sign representing the amount of price savings. For example, the different font size of the "$" sign can represent the differences in fuel price. The "$" sign for the seventh sub-region 224 can be bigger than the "$" sign for the first sub-region 212. The bigger "$" sign can mean that the fuel price for the seventh sub-region 224 can be cheaper than the fuel price of for the first sub-region 212.

A trend 240 can represent the pattern of the price information for the region 204. For example, traversing along the route 226 from the past location 238 to the target destination 228, the size of the "$" sign increases. Based on the price information for each sub-region, the trend 240 for the fuel price along the route 226 can indicate that the fuel price is cheaper as the user approaches the target destination 228.

The trend 240 can represent different patterns of information. For example, the patterns can be linear, parabolic, geometric, or combination thereof. For example, the region 204 is shown with a proximate linear decreasing pricing pattern for the trend 240 from the rural regions 230 to the metropolitan region 232.

The trend 240 can be applied to represent patterns for other types of information. For example, the trend 240 can represent the increase in the number of Chinese restaurants in the region 204. The trend 240 can represent the decrease in the sales tax in the region 204.

At the current time of interest 208, the display interface 202 can display current information for the region 204. For example, the display interface 202 can display the current price information of fuel stations in the region 204. The known regions 234 can be the first sub-region 212, the second sub-region 214, the third sub-region 216, the fourth sub-region 218, the fifth sub-region 220, and the seventh sub-region 224.

At the current time of interest 208, the region 204 can depict the sixth sub-region 222 as the sole representative of the unknown regions 236. The current time of interest 208 can depict a current location 242. The current location 242 can indicate user's current geographical location along the route 226.

The information within the sub-regions can change over time. For example, the price information for the fifth sub-region 220 of the past time of interest 206 can be unavailable. The price information for the fifth sub-region 220 of the current time of interest 208 can be available.

At the future time of interest 210, the display interface 202 can depict extrapolated information 244 for the region 204. The extrapolated information 244 can represent the fuel price for the region 204.

The extrapolation of the fuel price can be based on the analysis of the price information for the past time of interest 206 and the current time of interest 208 of the region 204. The extrapolation can also be based on the trend 240 of the price information. The extrapolation can predict or to estimate the fuel prices in the future or where the information is unavailable or scant at the current time of interest 208 as well.

At the future time of interest 210, the display interface 202 can also depict a future location 246. The future location 246 can indicate user's geographical location along the route 226 in the future.

The navigation system 100 can generate a relative ranking 248 of the sub-regions based on the extrapolated information 244. For example, the relative ranking 248 can order the sub-regions from the cheapest to the most expensive fuel prices in the region 204. The relative ranking 248 can be displayed on the display interface 202.

Figure 3:
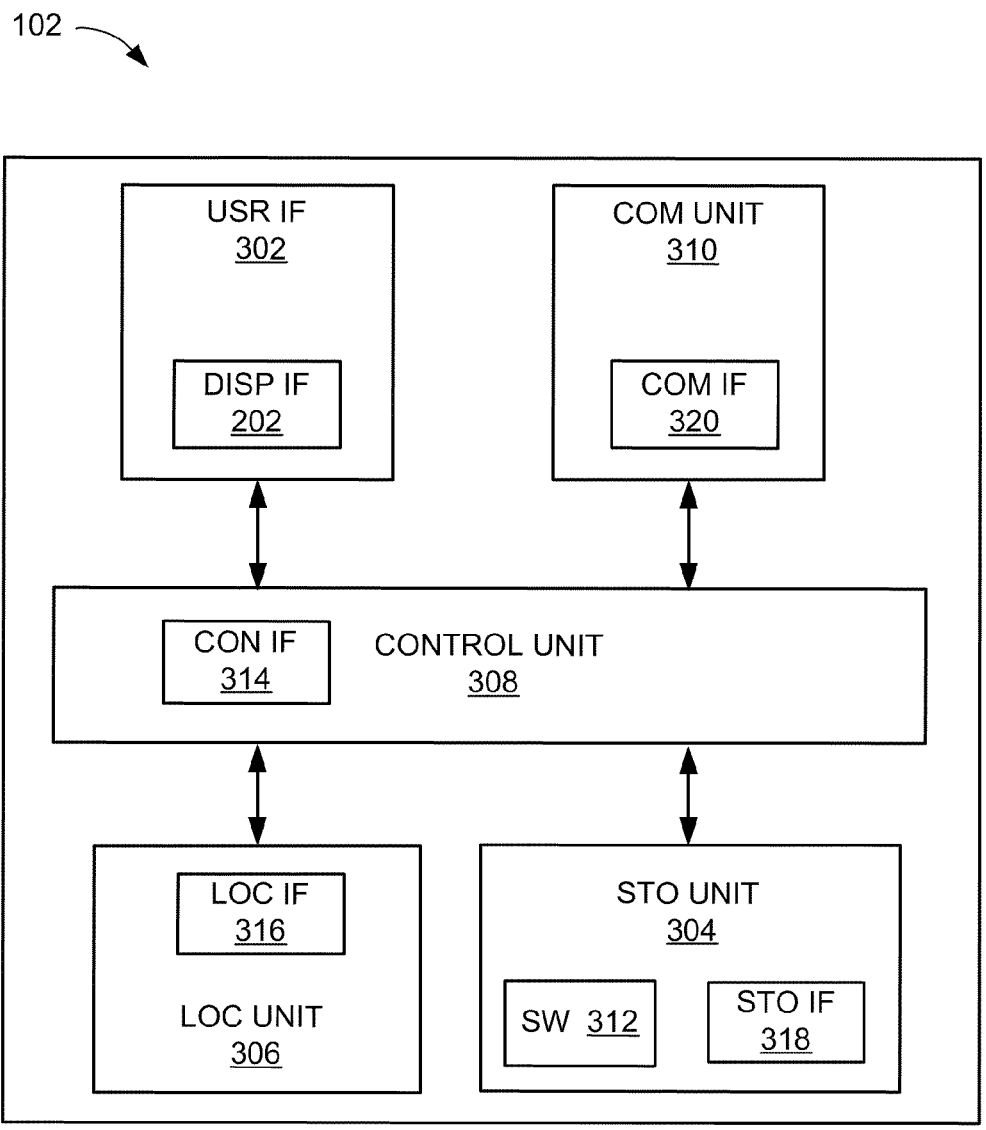
FIG. 3 is an exemplary block diagram of the first device of the navigation system of FIG. 1.

Referring now to FIG. 3, therein is shown an exemplary block diagram of the first device 102 of the navigation system 100 of FIG. 1. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cell-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
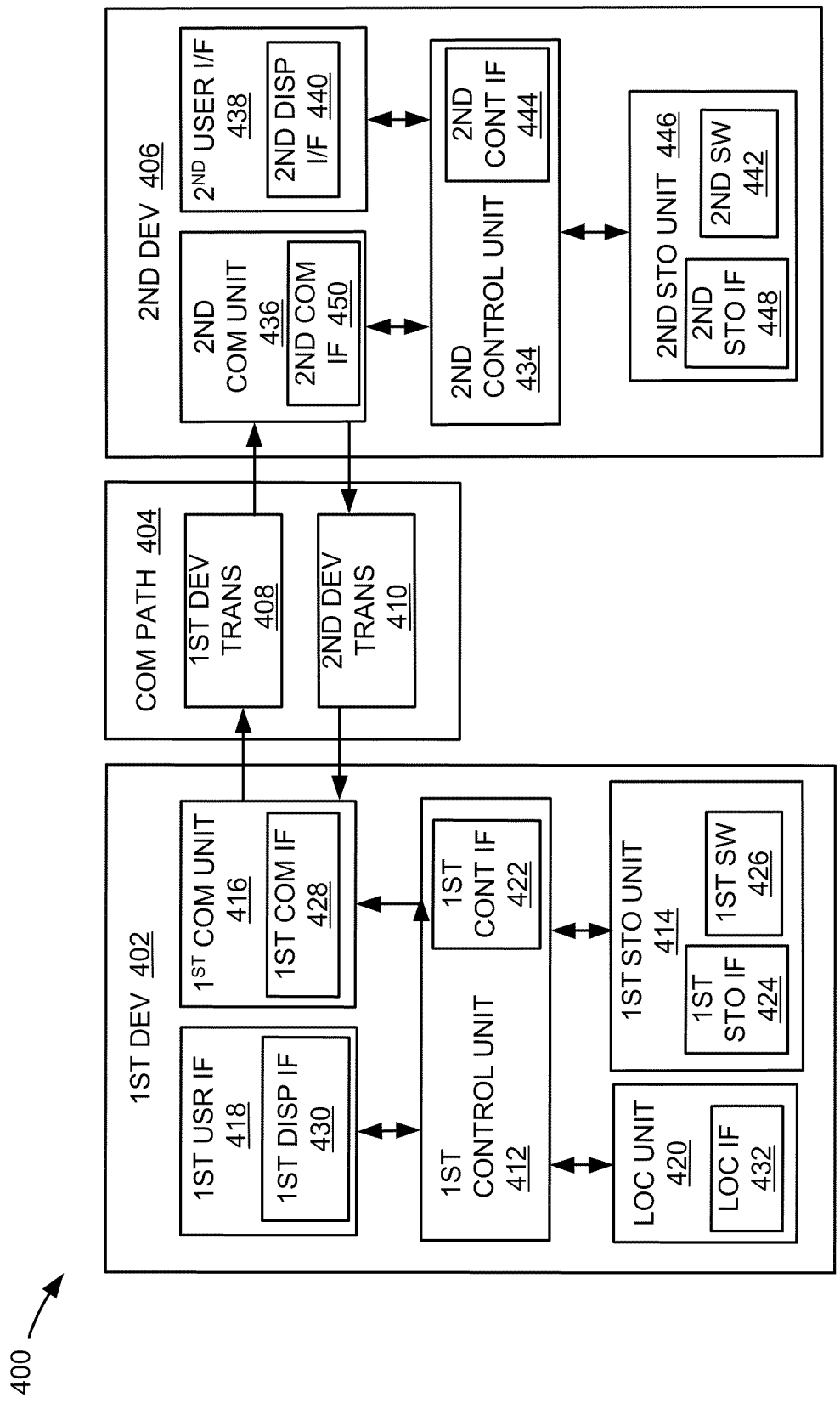
FIG. 4 is an exemplary block diagram of a navigation system with relative ranking mechanism in a second embodiment of the present invention.

Referring now to FIG. 4, therein is shown an exemplary block diagram of a navigation system 400 with relative ranking mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first control interface 422. The first control unit 412 and the first control interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
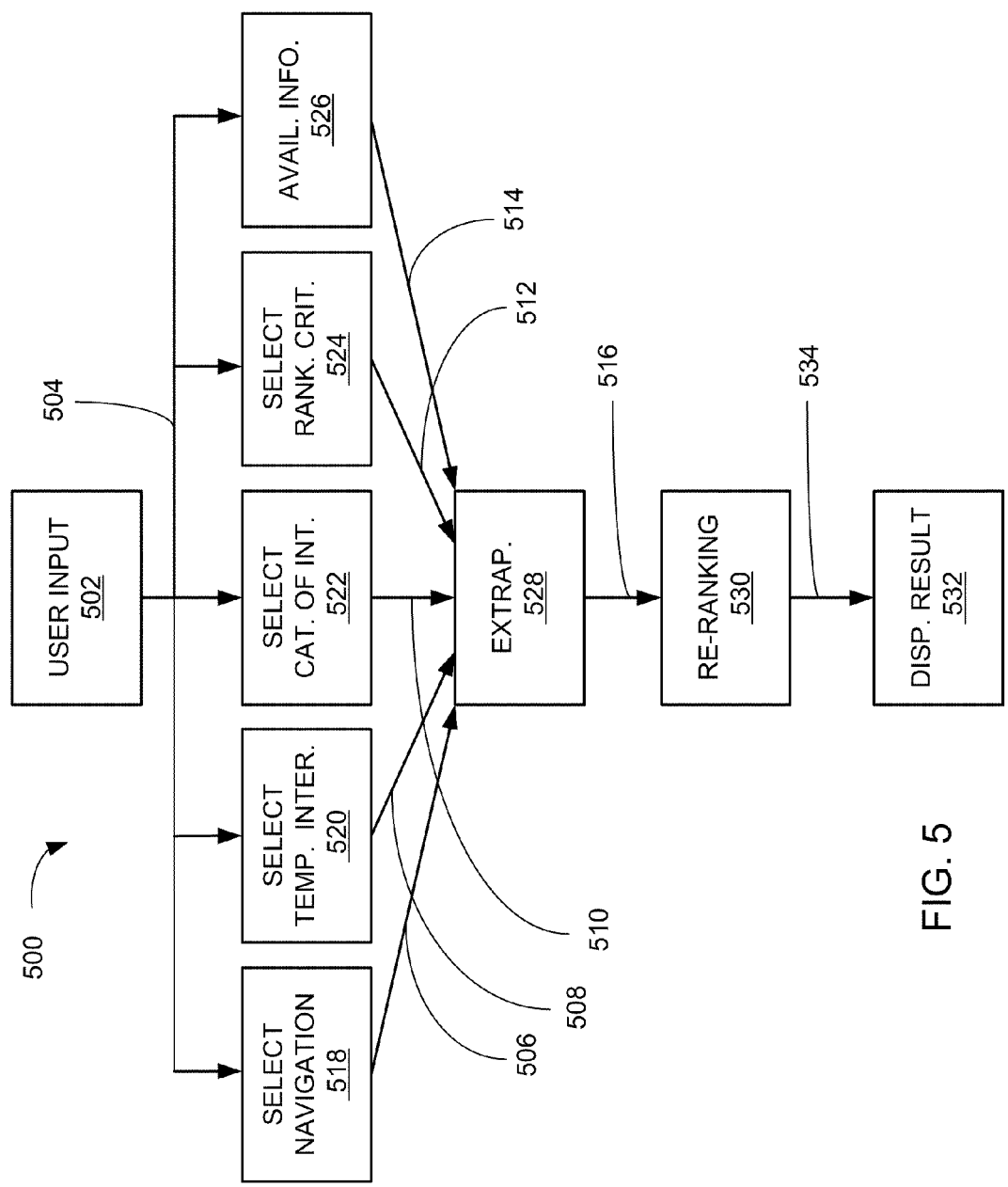
FIG. 5 is a navigation system with relative ranking mechanism in a third embodiment of the present invention.

Referring now to FIG. 5, therein is shown a navigation system 500 with relative ranking mechanism in a third embodiment of the present invention. A user input module 502 can allow the user to input a manual general input 504 into the navigation system 500.

The manual general input 504 can represent an input for a navigation input 506, a temporal interest 508, a category of interest 510, and a ranking criteria 512, and an available information 514. The navigation system 500 can extrapolate a relative ranking 516 based on the navigation input 506, the temporal interest 508, the category of interest 510, the ranking criteria 512, and the available information 514. The relative ranking 516 can represent the relative ranking 248 of FIG. 2.

The user input module 502 can be linked to a select navigation module 518, a select temporal interest module 520, a select category of interest module 522, a select ranking criteria module 524, and an available information module 526. The select navigation module 518 can be linked to an extrapolation module 528. The select temporal interest module 520 can be linked to the extrapolation module 528. The select category of interest module 522 can be linked to the extrapolation module 528. The select ranking criteria module 524 can be linked to the extrapolation module 528. The available information module 526 can be linked to the extrapolation module 528.

The extrapolation module 528 can be linked to a re-ranking module 530. The re-ranking module 530 can be linked to a display result module 532.

For illustrative purposes, the navigation system 500 is shown having discrete modules, although it is understood that the navigation system 500 can include other modules or modules in different configurations. For example, the select navigation module 518, the select temporal interest module 520, the select category of interest module 522, and the select ranking criteria module 524, can be combined. The select ranking criteria module 524 can be a subcategory of the select category of interest module 522.

The select navigation module 518 can allow the user to determine the extrapolation of the relative ranking 516 based on the sub-regions described in FIG. 2 or the route 226 of FIG. 2. The select navigation module 518 can parse the manual general input 504 to select the navigation input 506.

The navigation input 506 can include the region 204, the route 226 or the combination thereof. For example, if the user selects the route 226 as part of the manual general input 504, the select navigation module 518 can parse, remove, or ignore other data, such as the temporal interest 508 and the category of interest 510, from the manual general input 504 and retain the route 226 as part of the navigation input 506.

The navigation input 506 can be parsed from the manual general input 504 or can be automatically selected by the select navigation module 518. The region 204 can be selected from the manual general input 504 or an automatic selection by the select navigation module 518, or the combination thereof. For example, the location unit 306 of FIG. 3 can detect the current location 242 of the user. Based on the detection of the current location 242, the select navigation module 518 can automatically provide the sub-region in the region 204 where the current location 242 is located.

The route 226 can include the path that the person or device travels from the current location 242 to the target destination 228. The route 226 can be selected with the manual general input 504 or automatically selected by the select navigation module 518. For example, the location unit 306 can detect the current location 242 of the person or device while the person or device traverses along the route 226. The first device 102 of FIG. 3 can calculate the route 226 the user can take from the current location 242 to reach the target destination 228. Based on the calculation, the select navigation module 518 can automatically provide the route 226 as part of the navigation input 506.

The select navigation module 518 can send the navigation input 506 to the extrapolation module 528. The details for the extrapolation module 528 will be discussed later.

The select temporal interest module 520 can allow the user to determine the time period for the relative ranking 516 that the user seeks to extrapolate. The select temporal interest module 520 can parse the manual general input 504 to select the temporal interest 508.

The temporal interest 508 can represent the current time of interest 208 of FIG. 2 or the future time of interest 210 of FIG. 2. The temporal interest 508 can represent the time period for the relative ranking 516.

The select temporal interest module 520 can allow the navigation system 500 to automatically select, input, or generate the temporal interest 508 into the navigation system 500. For example, using the calendar, the navigation system 500 can choose the current time of interest 208 or the future time of interest 210.

The select temporal interest module 520 can parse the manual general input 504 and assign the current time of interest 208 or the future time of interest 210 to the temporal interest 508. The select temporal interest module 520 can send the temporal interest 508 to the extrapolation module 528.

The select category of interest module 522 can allow the user to determine the category of interest 510 for the extrapolation of the relative ranking 516. The select category of interest module 522 can parse the manual general input 504 to select the category of interest 510. Examples of the category of interest 510 can include restaurants, shops, fuel vendor chains, or a combination thereof.

The category of interest 510 can be based on sub-regional boundaries along the route 226. The select category of interest module 522 can send the category of interest 510 to the extrapolation module 528.

The select ranking criteria module 524 can allow the user to determine the ranking criteria 512 for the extrapolation of the relative ranking 516. The select ranking criteria module 524 can parse the manual general input 504 to select the ranking criteria 512.

Examples of the ranking criteria 512 can include price, quality, accessibility, special promotion, or a combination thereof. The user can select "refueling station" or "fuel cell charging station" for the category of interest 510 and "price" for the ranking criteria 512. The navigation system 500 can extrapolate the relative ranking 516 for the refueling station based on the price.

The select ranking criteria module 524 can also allow the navigation system 500 to automatically select or generate the ranking criteria 512. The select ranking criteria module 524 can send the ranking criteria 512 to the extrapolation module 528.

The available information module 526 can provide the data required for the extrapolation of the relative ranking 516. The available information module 526 can allow the user to directly input the data into the navigation system 500 as part of the manual general input 504. The available information module 526 can store the data into the available information 514.

The available information module 526 can also manipulate the available information 514 with the manual general input 504. The available information module 526 can send the available information 514 to the extrapolation module 528. The details of the available information module 526 will be discussed later.

The unknown regions 236 can include the geographic area where the available information 514 is partial or no data. The known regions 234 can include the geographic area where the available information 514 is available. The metropolitan region 232 can represent the geographic area where the available information 514 includes full data or significantly populated data for the metropolitan. The rural regions 230 can represent the geographic area where the available information 514 is scant in data.

The extrapolation module 528 can extrapolate the relative ranking 516 based on the navigation input 506, the temporal interest 508, the category of interest 510, the ranking criteria 512, and the available information 514. The relative ranking 248 of FIG. 2 displayed on the display interface 202 of FIG. 2 can illustrate the relative ranking 516 extrapolated by the navigation system 500. The extrapolation module 528 can send the relative ranking 516 to the re-ranking module 530. The details of the extrapolation module 528 will be discussed later.

The re-ranking module 530 can manipulate the relative ranking 516 based on the navigation input 506 to generate a relative re-ranking 534. The re-ranking module 530 can send the relative re-ranking 534 to the display result module 532. The details of the re-ranking module 530 will be discussed later.

The display result module 532 can display the relative re-ranking 534 on the display interface 202. The relative re-ranking 534 can also be displayed on the first user interface 418 of FIG. 4.

The software 312 of FIG. 3 can include the navigation system 500. For example, the software 312 can include the select navigation module 518, the select temporal interest module 520, the select category of interest module 522, the select ranking criteria module 524, and the available information module 526.

The user input module 502 can represent the user interface 302 of FIG. 3. The manual general input 504 can be selected or inputted into the user interface 302. The control unit 308 of FIG. 3 can execute the software 312 to parse the manual general input 504 into the navigation input 506, the temporal interest 508, the category of interest 510, the ranking criteria 512, and the data for the available information module 526. The control unit 308 can also execute the software 312 to operate the communication unit 310 of FIG. 3 and the location unit 306 of FIG. 3.

The software 312 can be executed to extrapolate the relative ranking 516. The control unit 308 can execute the software 312 to execute the select navigation module 518, the select temporal interest module 520, the select category of interest module 522, the select ranking criteria module 524, and the available information module 526. The control unit 308 can execute the software 312 to generate the relative ranking 516 based on the navigation input 506, the temporal interest 508, the category of interest 510, the ranking criteria 512, and the available information 514.

The control unit 308 can execute the software 312 to generate the relative re-ranking 534 based on the relative ranking 516. The relative re-ranking 534 can be displayed on the display interface 202.

The navigation system 500 can be partitioned between the first device 402 of FIG. 4 and the second device 406 of FIG. 4. For example, the navigation system 500 can be partitioned into the functional units of the first device 402, the second device 406, or a combination thereof. The navigation system 500 can also be implemented as additional functional units in the first device 102 of FIG. 1, the first device 402, the second device 406, or a combination thereof.

As another example, the navigation system 500 can be partitioned between the first software 426 of FIG. 4 and the second software 442 of FIG. 4. For example, the second software 442 can include the available information module 526, the extrapolation module 528, and the re-ranking module 530. The second control unit 434 of FIG. 4 can execute the modules partitioned on the second software 442.

The first software 426 can include the select navigation module 518, the select temporal interest module 520, the select category of interest module 522, the select ranking criteria module 524, and the display result module 532. Based on the size of the first storage unit 414 of FIG. 4, the first software 426 can include additional modules of the navigation system 500. The first control unit 412 of FIG. 4 can execute the modules partitioned on the first software 426.

The manual general input 504 can be selected or inputted into first user interface 418 of FIG. 4. The first control unit 412 can parse the manual general input 504 with the first software 426. The first control unit 412 can operate the first communication unit 416 of FIG. 4 to send the manual general input 504 to the second device 406. The second device 406 can execute the second software 442 and can also parse the manual general input 504.

For example, the second software 442 can parse the manual general input 504 into the navigation input 506, the temporal interest 508, the category of interest 510, the ranking criteria 512, and the data for the available information module 526. The second software 442 can generate the relative ranking 516 and the relative re-ranking 534.

The second communication unit 436 of FIG. 4 can send the relative re-ranking 534 to the first device 402 through the communication path 404 of FIG. 4. The relative re-ranking 534 can be displayed on the first display interface 430. The relative re-ranking 534 can be displayed on the second device 106 of FIG. 1.

The navigation system 500 describes the module functions or order as an example. The modules can be partitioned differently. Each of the modules can operate individually and independently of the other modules.

Figure 6:
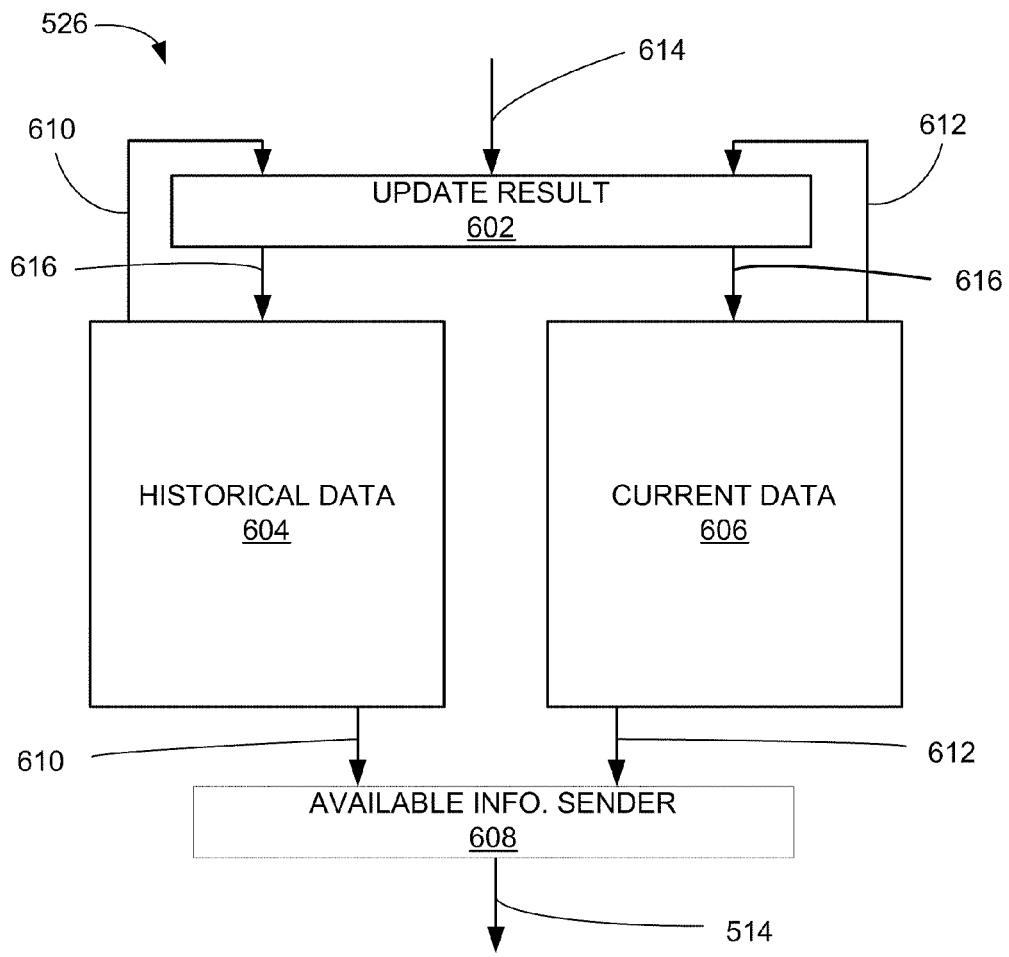
FIG. 6 is a detailed view of the available information module of FIG. 5.

Referring now to FIG. 6, therein is shown a detailed view of the available information module 526 of FIG. 5. The available information module 526 can be linked to the user input module 502 of FIG. 5 and the extrapolation module 528 of FIG. 5.

The available information module 526 can include an update result module 602, a historical data module 604, a current data module 606, and an available information sender 608. The available information 514 can represent the information for the category of interest 510 of FIG. 5 in the region 204 of FIG. 2.

The available information 514 can include historical data 610 of the historical data module 604 and current data 612 of the current data module 606 for the category of interest 510. For illustrative purposes, the available information module 526 is shown having discrete modules, although it is understood that the available information module 526 can include other modules or modules in different configurations. For example, the historical data module 604 and the current data module 606 can be combined.

A user generated content 614 can be included as part of the manual general input 504 of FIG. 5. For example, the user can input the price information of refueling stations as the user generated content 614 for the region 204 with the manual general input 504.

The update result module 602 can receive the user generated content 614 from the user input module 502 of FIG. 5. The update result module 602 can generate an updated version 616 to update, correct, delete, or add at least a portion of the available information 514 based on the user generated content 614.

For example, the available information 514 can be the price information of the refueling station in the region 204. The price information of the fifth sub-region 220 of FIG. 2 at the past time of interest 206 of FIG. 2 can be unavailable. The user generated content 614 can contain the price information for the fifth sub-region 220. The user can input the user generated content 614 into available information module 526.

The update result module 602 can generate the updated version 616 based on the user generated content 614. The update result module 602 can add the price information for the fifth sub-region 220 into the historical data module 604 or the current data module 606 with the updated version 616. The price information of the fifth sub-region 220 for the current time of interest 208 of FIG. 2 can reflect the update made by the updated version 616. After the update, the price information for the fifth sub-region 220 can be available.

The historical data module 604 can store the historical data 610. For example, the price information for the refueling station of the region 204 for the past time of interest 206 can be stored in the historical data 610. The historical data module 604 can initially be populated by preloading the data, by storing the user generated content 614, or the combination thereof. For example, the user can upload the historical data 610 from a data file, such as a CD or DVD, into the historical data module 604 for preloading the data.

The historical data module 604 can receive the updated version 616 from the update result module 602. The historical data module 604 can reflect the changes, such as the updates, correction, deletion, and the addition, made in the updated version 616 to the historical data 610. For example, the historical data 610 for the price information for the second sub-region 214 of FIG. 2 can be $3.95 per gallon. The price information for the second sub-region 214 can be updated by the updated version 616 to $3.85 per gallon.

The historical data module 604 can send the historical data 610 to the update result module 602. Based on the historical data 610 and the user generated content 614, the update result module 602 can determine whether any changes are required to update the historical data module 604.

For example, the price information of the refueling station for the first sub-region 212 can be $4.00 per gallon. The price information of the refueling information for the first sub-region 212 entered by the user generated content 614 can be $4.00 per gallon. In this case, the update result module 602 will not update the historical data module 604, because there is no difference between the historical data 610 and the user generated content 614.

If there is a difference between the historical data 610 and the user generated content 614, the update result module 602 can generate the updated version 616 to update the historical data module 604. For example, the price information of the refueling information for the first sub-region 212 entered by the user generated content 614 can be $3.50 per gallon. The update result module 602 can generate the updated version 616 to update the historical data 610 from $4.00 per gallon to $3.50 per gallon.

The current data module 606 can store the current data 612. For example, the price information for the refueling station of the region 204 at the current time of interest 208 can be stored in the current data 612. The current data module 606 can initially be populated by pre-loading the data, by storing the user generated content 614, or the combination thereof. For example, the user can upload the current data 612 from a data file, such as a CD or DVD, into the current data module 606 for preloading the data.

The current data module 606 can receive the updated version 616 from the update result module 602. The current data module 606 can reflect the changes, such as the updates, corrections, deletions, and the additions, made in the updated version 616 to the current data 612. For example, the current data 612 for the price information for the third sub-region 216 of FIG. 2 can be $3.50 per gallon. The price information for the third sub-region 216 can be updated by the updated version 616 to $3.25 per gallon.

The current data module 606 can send the current data 612 to the update result module 602. Based on the current data 612 and the user generated content 614, the update result module 602 can determine whether any changes are required to update the current data module 606. If there is a difference between the current data 612 and the user generated content 614, the update result module 602 can generate the updated version 616 to update the current data module 606.

The historical data module 604 can be updated by the old version of the current data 612. For example, the updated version 616 updates the current data 612. The current data 612 that populated the current data module 606 prior to the update can become obsolete. The current data module 606 can send the obsolete data as part of the current data 612 to the update result module 602.

The update result module 602 can determine whether the obsolete data can update the historical data module 604. The update result module 602 can generate the updated version 616 based on the obsolete data if the obsolete data can update the historical data module 604. The update result module 602 can update the historical data module 604 based on the updated version 616.

The historical data module 604 can send the historical data 610 to the available information sender 608. The current data module 606 can send the current data 612 to the available information sender 608. The available information sender 608 can send the historical data 610, the current data 612, or a combination thereof as the available information 514 to the extrapolation module 528.

The update result module 602 can filter the available information 514 between the historical data 610 and the current data 612. The historical data 610 or the current data 612 can differ based on where the user or the device is on the route 226 or the region 204. By filtering, the update result module 602 can differentiate based on the route 226 or the sub-regions within the region 204. The update result module 602 can send the historical data 610 to the historical data module 604 and the current data 612 to the current data module 606.

The software 312 of FIG. 3 can include the available information module 526. The second software 442 of FIG. 4 can also include the available information module 526.

Figure 7:
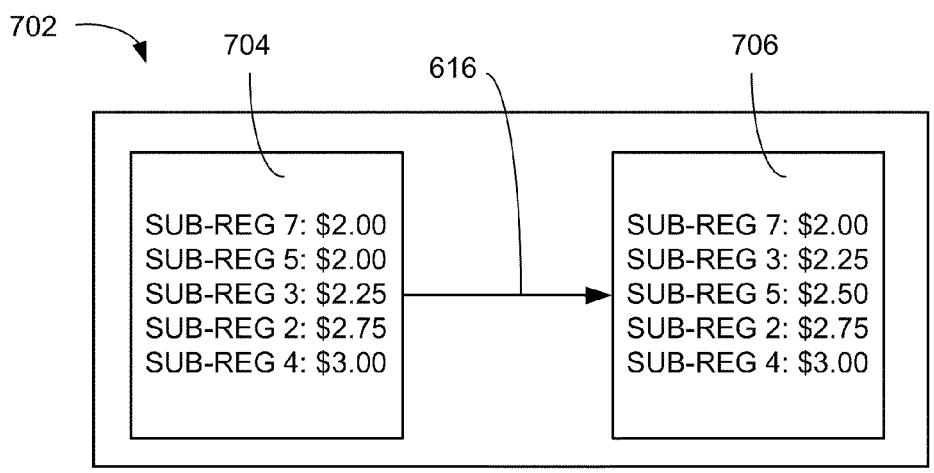
FIG. 7 is a diagrammatical example of the improvement of an accuracy of the relative ranking of FIG. 5.

Referring now to FIG. 7, therein is shown a diagrammatical example of the improvement of an accuracy 702 of the relative ranking 516 of FIG. 5. For illustrative purposes, an initial relative ranking 704 and an improved relative ranking 706 can be examples of the relative ranking 516.

For example, the initial relative ranking 704 can represent the relative ranking 516 of the price information for the region 204 of FIG. 2. The price information can be the following: the seventh sub-region 224—$2.00; the third sub-region 216—$2.25; the fifth sub-region 220—price unknown; the second sub-region 214—$2.75; and the fourth sub-region 218—$3.00. In this example, the relative ranking 516 of the price information for the region 204 can be differ from the actual price, because the price information for the fifth sub-region 220 is extrapolated to $2.00 without actual information within the fifth sub-region 220.

The user generated content 614 of FIG. 6 as $2.50 can be entered for the fifth sub-region 220 to generate the updated version 616 of FIG. 6. The user generated content 614 can be used to improve the accuracy 702 of the relative ranking 516 from the initial relative ranking 704 to the improved relative ranking 706. The improved relative ranking 706 can represent the relative ranking 516 with the improvement of the accuracy 702 for the price information for the region 204.

Figure 8:
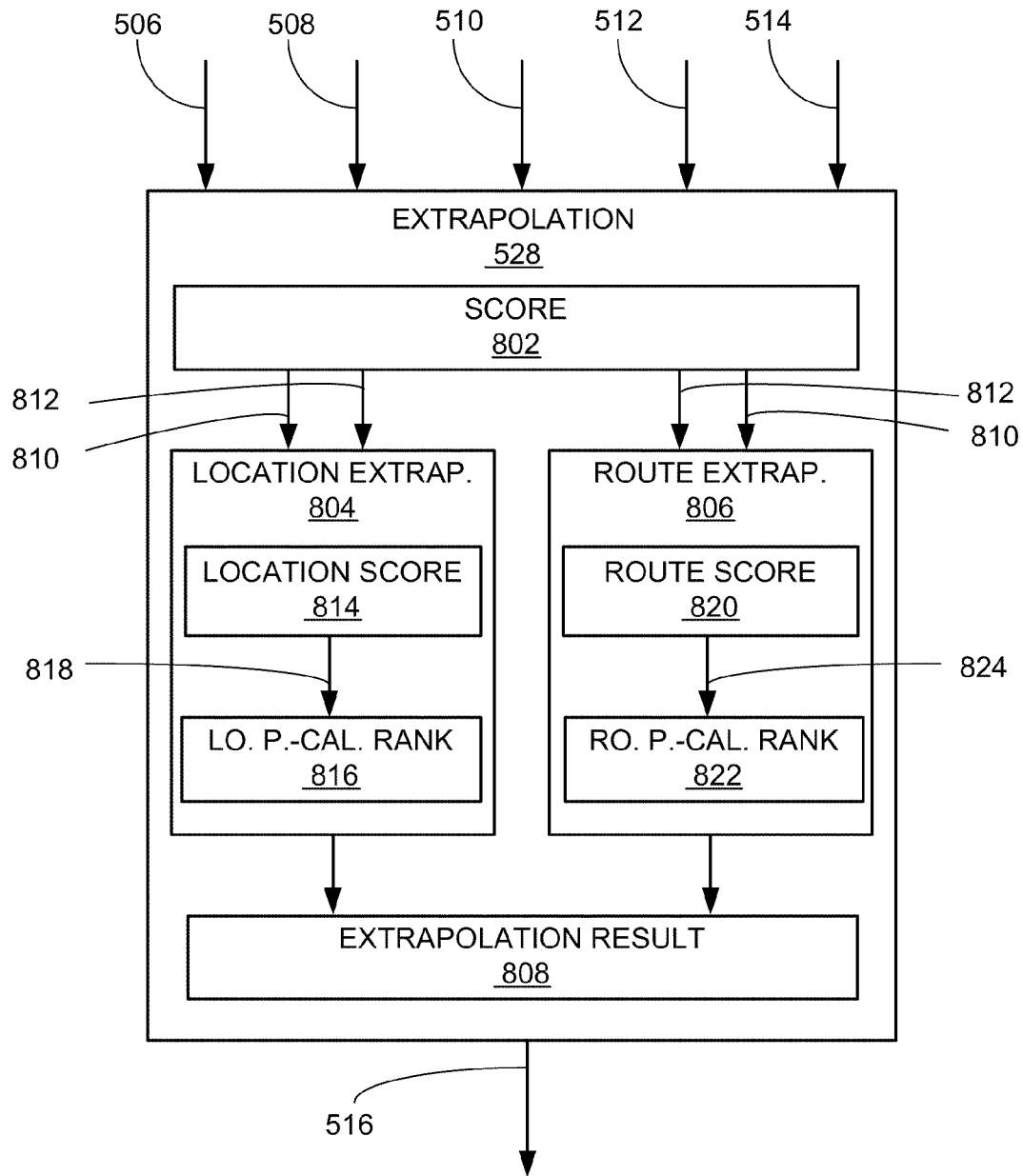
FIG. 8 is a detailed view of the extrapolation module of FIG. 5.

Referring now to FIG. 8, therein is shown a detailed view of the extrapolation module 528 of FIG. 5. The extrapolation module 528 can include a score module 802, a location extrapolation module 804, a route extrapolation module 806, and an extrapolation result module 808.

The extrapolation module 528 can extrapolate or estimate information for sub-regions have no or little information using known information from other sub-regions. The extrapolation or estimation can be performed with using past information, current information or a combination thereof for the sub-regions. The extrapolation or estimation can be for the current time or a future time.

For illustrative purposes, the extrapolation module 528 is shown having discrete modules, although it is understood that the extrapolation module 528 can include other modules or modules in different configurations. For example, the location extrapolation module 804 and the route extrapolation module 806 can be combined.

The score module 802 provides an initial metric for a geographic region or sub-region. The metric can be used to create a relative ranking for a particular category of interest with known or extrapolated information.

The score module 802 can receive the navigation input 506 of FIG. 5, the temporal interest 508 of FIG. 5, the category of interest 510 of FIG. 5, the ranking criteria 512 of FIG. 5, and the available information 514 of FIG. 5. Based on the navigation input 506, the temporal interest 508, the category of interest 510, the ranking criteria 512, and the available information 514, the score module 802 can generate a scored number 810.

As an example, the generation of the scored number 810 can range from 1 to 100. The scored number 810 of 100 can represent the cheapest fuel pricing for the region 204. The scored number 810 of 1 can represent the most expensive fuel pricing for the region 204.

The user can select "refueling station" for the category of interest 510. The user or the navigation system 500 can select "Sunnyvale, Calif." for the current location 242 of FIG. 2 or the region 204. The user can select "price" for the ranking criteria 512. The available information 514 can contain price information related to seven refueling stations in Sunnyvale, Calif. The score module 802 can assign the scored number 810 to each refueling station according to the price level.

For example, if the gasoline price at refueling station A in Sunnyvale, Calif. is lower than the refueling station B in Sunnyvale, Calif., the score module 802 can assign the scored number 810 of "95" for refueling station A and "84" for refueling station B, respectively. The score module 802 can score the remaining refueling station similarly according to the price level. The higher value of the scored number 810 means a better value, in this example.

The score module 802 can generate a score trend 812 based on the scored number 810. The score trend 812 can represent the trend 240 of FIG. 2. For example, the gasoline price for refueling stations in Sunnyvale becomes cheaper as the user traverses along the route 226 from the current location 242 to the target destination 228. Respectively, the value of the scored number 810 can increase along the route 226 from the current location 242 to the target destination to reflect the cheaper gasoline price. Based on the scored number 810, the score module 802 can generate the score trend 812. For this example, the score trend 812 reflects the trend of increasing in value of the scored number 810 traversing along the route 226.

Based on the navigation input 506, the score module 802 can send the scored number 810 and the score trend 812 to the location extrapolation module 804, to the route extrapolation module 806, or a combination thereof. For example, the user selects the region 204 for the select navigation module 518. The score module 802 can send the scored number 810 and the score trend 812 to the location extrapolation module 804. If the user selects the route 226 for the select navigation module 518, the score module 802 can send the scored number 810 and the score trend 812 to the route extrapolation module 806.

The location extrapolation module 804 can extrapolate scores for the unknown sub-regions in the geographic region at a current time or a future time. The location extrapolation module 804 can use the scores from the score module 802. The location extrapolation module 804 can also extrapolate scores for the known regions at a future time. The location extrapolation module 804 can generate a relative ranking for a category of interest.

The location extrapolation module 804 can include a location score module 814 and a location pre-calculated rank module 816. The location extrapolation module 804 can extrapolate the relative ranking 516 of FIG. 5 for the sub-regions of FIG. 2, the region 204 of FIG. 2, or the combination thereof. The location pre-calculated rank module 816 can generate a relative ranking.

The location extrapolation module 804 can receive the scored number 810 and the score trend 812 from the score module 802. The location extrapolation module 804 can receive the temporal interest 508, the category of interest 510, the ranking criteria 512, and the available information 514. Based on the scored number 810, the score trend 812, the temporal interest 508, the category of interest 510, the ranking criteria 512, and the available information 514, the location score module 814 can extrapolate a location score 818. The location score 818 can range from 1 to 100.

If the user or the navigation system 500 itself selects the future time of interest 210 of FIG. 2 for the temporal interest 508, the location score module 814 can extrapolate the location score 818 for the future time of interest 210. For example, the user can select "Sunnyvale, Calif." for the current location 242. The user can select "refueling station" for the category of interest 510. The user can select "price" for the ranking criteria 512. The available information 514 can contain price information for the seven refueling stations in Sunnyvale, Calif. at the past time of interest 206 of FIG. 2 and at the current time of interest 208.

The score module 802 can assign the scored number 810 to seven refueling stations. The score trend 812 can indicate that the price for the refueling stations surrounding Sunnyvale, Calif. becomes cheaper as the user traverses along the route 226 towards the target destination 228.

Based on the scored number 810, the score trend 812, the category of interest 510, the ranking criteria 512, and the available information 514, the location score module 814 can extrapolate the location score 818 for seven refueling stations in Sunnyvale, Calif. For example, the region 204 at the future time of interest 210 shown in FIG. 2 can represent the visual display of the relative value of the location score 818 assigned to the seven refueling stations.

The location score 818 for the first sub-region 212 at the future time of interest 210 can have a lower value, such as "85," to indicate the more expensive price for the refueling station. The location score 818 for the seventh sub-region 224 at the future time of interest 210 can have a higher value, such as "99," to indicate the cheaper price for the refueling station. The location score module 814 can send the location score 818 to the location pre-calculated rank module 816.

Based on the location score 818, the location pre-calculated rank module 816 can generate the relative ranking 516 for the future time of interest 210. For example, the location score module 814 can generate the location score 818 for the first sub-region 212—85, the second sub-region 214—90, the third sub-region 216—95, the fourth sub-region 218—87, the fifth sub-region 220—92, the sixth sub-region 222—97, and the seventh sub-region 224—99.

Based on the location score 818 for each of the sub-regions, the location pre-calculated rank module 816 can generate the relative ranking 516 from the highest to the lowest value: the seventh sub-region 224; the sixth sub-region 222; the third sub-region 216; the fifth sub-region 220; the second sub-region 214; the fourth sub-region 218; and the first sub-region 212.

If the user selects one of the unknown regions 236 of FIG. 2 or one of the rural regions 230 of FIG. 2, the location score module 814 can estimate the location score 818 for the region 204 that can include the unknown regions 236 or the rural regions 230. The estimation can be based on the scored number 810, the score trend 812, the category of interest 510, the ranking criteria 512, and the available information 514. The available information 514 can contain information for the region 204 that can include the known regions 234 of FIG. 2, the unknown regions 236, the metropolitan region 232 of FIG. 2, the rural regions 230 or the combination thereof.

For example, the user can select "Ripon, Calif.," which can be the unknown regions 236. The user can select "refueling station" for the category of interest 510. The user can select "price" for the ranking criteria 512. Manteca, Calif. can be the first sub-region 212. Modesto, Calif. can be the known regions 234. Stockton, Calif. can be the metropolitan region 232.

Based on the scored number 810, the score trend 812, the category of interest 510, the ranking criteria 512, and the available information 514, the location score module 814 can estimate the location score 818 for Ripon, Calif. For example, the score trend 812 can indicate that the price for refueling stations becomes cheaper as the user traverses along the route 226 towards the target destination 228. The scored number 810 can indicate that the scored number 810 for Manteca, Calif. will have lower value than the scored number 810 of Modesto, Calif. The scored number 810 can indicate that the scored number 810 for Modesto, Calif. will have lower value than the scored number 810 of Stockton, Calif. Ripon, Calif. can be located between Manteca, Calif. and Stockton, Calif.

Based on the score trend 812, the location score module 814 can estimate that the location score 818 for Ripon, Calif. can be higher than the location score 818 for Manteca, Calif. The location score module 814 can also estimate that the location score 818 for Ripon, Calif. can be equal to the location score 818 for Modesto, Calif. The location score module 814 can further estimate that the location score 818 for Ripon, Calif. can be lower than the location score 818 for Stockton, Calif. The region 204 at the future time of interest 210 depicted in FIG. 2 can represent the visual display of the location score module 814 estimating the location score 818 for the region 204.

Based on the location score 818, the location pre-calculated rank module 816 can generate the relative ranking 516 for the unknown regions 236 or the rural regions 230. For example, the location score module 814 can score the location score 818 for each region as the following: Manteca, Calif.—85; the second sub-region 214—90; Modesto, Calif.—95; the fourth sub-region 218—87; the fifth sub-region 220—92; Ripon, Calif.—97; and Stockton, Calif.—99. Based on the location score 818 for each region, the location pre-calculated rank module 816 can generate the relative ranking 516 from the highest to the lowest value: Stockton, Calif.; Ripon, Calif.; Modesto, Calif.; the fifth sub-region 220; the second sub-region 214; the fourth sub-region 218; and Manteca, Calif.

For illustrative purposes, the location extrapolation module 804 is shown having discrete modules, although it is understood that the location extrapolation module 804 can include other modules or modules in different configurations. For example, the location score module 814 and the location pre-calculated rank module 816 can be combined.

The route extrapolation module 806 can extrapolate scores along the route at a current time or a future time. The route extrapolation module 806 can generate a relative ranking for a category of interest.

The route extrapolation module 806 can include a route score module 820 and a route pre-calculated rank module 822. The route extrapolation module 806 can extrapolate the relative ranking 516 for the route 226 of FIG. 2. The route pre-calculated rank module 822 can generate a relative ranking.

The route extrapolation module 806 can receive the scored number 810 and the score trend 812 from the score module 802. The route extrapolation module 806 can receive the temporal interest 508, the category of interest 510, the ranking criteria 512, and the available information 514 from the score module 802.

Based on the scored number 810, the score trend 812, the temporal interest 508, the category of interest 510, the ranking criteria 512, and the available information 514, the route score module 820 can extrapolate a route score 824. The route score module 820 can extrapolate the route score 824 in a similar manner as the location score module 814 extrapolates the location score 818. The region 204 of the future time of interest 210 can represent the visual display of the route score module 820 extrapolating the route score 824 for the region 204. The route score module 820 can send the route score 824 to the route pre-calculated rank module 822.

Based on the route score 824, the route pre-calculated rank module 822 can generate the relative ranking 516 for the category of interest 510 for the route 226, the region 204, or the combination thereof. For example, the route pre-calculated rank module 822 can generate the relative ranking 516 for the cheapest to the most expensive refueling stations along the route 226.

The user can select "Sunnyvale, Calif." for the current location 242 and "Mountain View, Calif." for the target destination 228 of FIG. 7. If the user or the navigation system 500 itself selects the future time of interest 210, the route pre-calculated rank module 822 can generate the relative ranking 516 for refueling stations along the route 226 from Sunnyvale, Calif. to Mountain View, Calif. for the future time of interest 210.

If the user selects the route 226 that traverses through the unknown regions 236 or the rural regions 230, the route pre-calculated rank module 822 can generate the relative ranking 516 for the category of interest 510 along the route 226. For example, the user can select "Modesto, Calif." for the current location 242 and "Stockton, Calif." for the target destination 228. The route 226 between Stockton, Calif. and Modesto, Calif. can traverse through the unknown regions 236.

The user can select "refueling station" for the category of interest 510. The user can select "price" for the ranking criteria 512. The route pre-calculated rank module 822 can generate the relative ranking 516 for the refueling station along the route 226 between Stockton, Calif. and Modesto, Calif. The region 204 at the future time of interest 210 shown in FIG. 2 can illustrate the visual depiction of the user traversing through the unknown regions 236 or the rural regions 230.

The generation of the relative ranking 516 can differ based on the availability of the data in the available information 514. For example, in the metropolitan region 232 where data is abundant, a full ranking of the category of interest 510 can be presented to the user. Rather than providing the relative ranking 516 for the refueling station chain, the relative ranking 516 for individual refueling stations can be provided for the user.

If the route 226 passes the unknown regions 236 or the rural regions 230, the combination of the relative ranking 516 can be provided to the user. For example, rather than providing the relative ranking 516 for individual refueling stations, the relative ranking 516 based on the combination of refueling station chain and the region 204 can be provided for the user.

For illustrative purposes, the route extrapolation module 806 is shown having discrete modules, although it is understood that the route extrapolation module 806 can include other modules or modules in different configurations. For example, the route score module 820 and the route pre-calculated rank module 822 can be combined.

The extrapolation result module 808 can be used to determine the type of the relative ranking The relative ranking can be for a specific geographical sub-region or for a route.

The extrapolation result module 808 can receive the relative ranking 516 from the location pre-calculated rank module 816 and the route pre-calculated rank module 822. The extrapolation result module 808 can send the relative ranking 516 selected from the location pre-calculated rank module 816 and the route pre-calculated rank module 822 to the re-ranking module 530.

It has been discovered that the present invention provides a navigation system for providing efficient relative ranking for category of interest based on a region or a route. The navigation system can generate efficient relative ranking for the unknown regions in the geographic region at a current time or a future time and for the known regions at a future time. The navigation system can extrapolate or estimate information for sub-regions having no or little information using known information from other sub-regions. The extrapolation or estimation can be performed with using past information, current information or a combination thereof for the sub-regions. The extrapolation or estimation can be for the current time or a future time.

Figure 9:
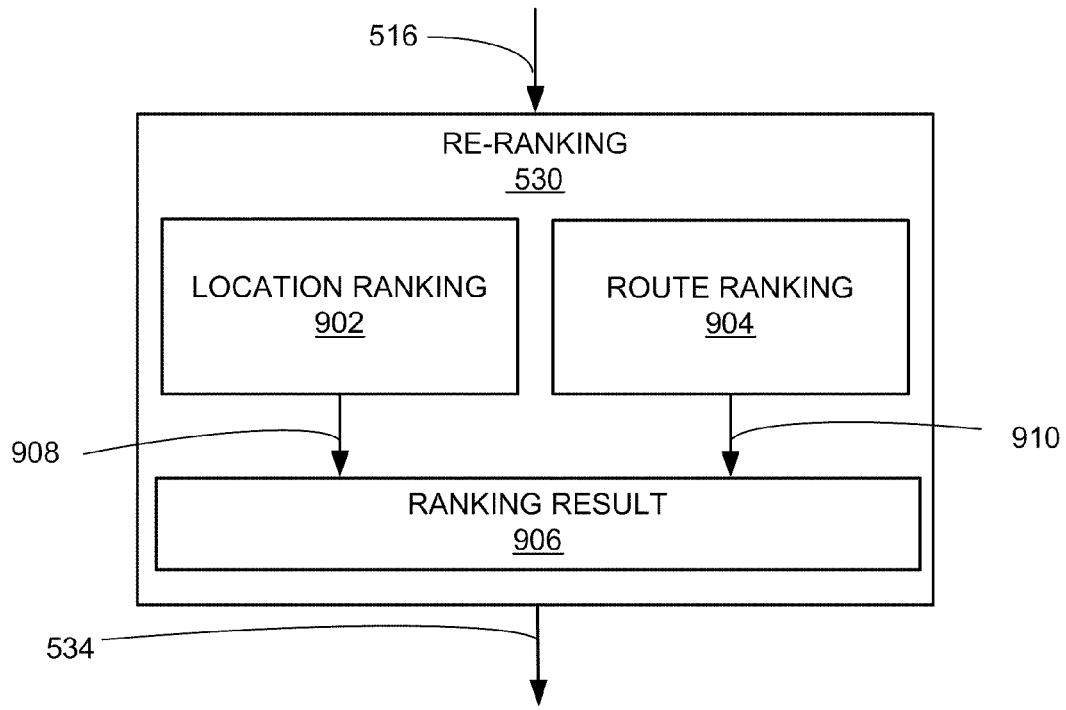
FIG. 9 is a detailed view of the re-ranking module of FIG. 5.

Referring now to FIG. 9, therein is shown a detailed view of the re-ranking module 530 of FIG. 5. The re-ranking module 530 can be linked to the extrapolation module 528 of FIG. 5 and the display result module 532 of FIG. 5.

The re-ranking module 530 can include a location ranking module 902, a route ranking module 904, and a ranking result module 906. For illustrative purposes, the re-ranking module 530 is shown having discrete modules, although it is understood that the re-ranking module 530 can include other modules or modules in different configurations. For example, the location ranking module 902 and the route ranking module 904 can be combined. The ranking result module 906 can be optional.

The location ranking module 902 can receive the relative ranking 516 from the extrapolation module 528. Based on the relative ranking 516, the location ranking module 902 can re-rank the relative ranking 516. For example, the relative ranking 516 can be re-ranked into top five results for the current location 242 of FIG. 2, the region 204 of FIG. 2, or the combination thereof as a location re-rank 908. The location ranking module 902 can send the location re-rank 908 to the ranking result module 906.

The route ranking module 904 can receive the relative ranking 516 from the extrapolation module 528. Based on the relative ranking 516, the route ranking module 904 can re-rank the relative ranking 516. For example, the relative ranking 516 can be re-ranked into top five results for the route 226, the region 204, or the combination thereof as a route re-rank 910. The location ranking module 902 can send the location re-rank 908 to the ranking result module 906.

If the user traverses along the route 226, the route ranking module 904 can update the route re-rank 910 based on the user's new geographical position. For example, the user can start from the past location 238 of FIG. 2 at the past time of interest 206 of FIG. 2. The user can traverse along the route 226 to reach the current location 242 of FIG. 2 at the current time of interest 208. The update can reflect the possible changes in the relative ranking 516 for the category of interest 510 based on the user's new geographical position on the route 226.

For example, when the user was at the past location 238, the route re-rank 910 can be ordered from the cheapest to most expensive: 1. the sixth sub-region 222; 2. the fifth sub-region 220; 3. the second sub-region 214; 4. the fourth sub-region 218; and 5. the first sub-region 212. The route re-rank 910 can be updated and reordered as follows when the user reaches the current location 242 as the following: 1. the seventh sub-region 224; 2. the sixth sub-region 222; 3. the third sub-region 216; 4. the fifth sub-region 220; and 5. the second sub-region 214. The ranking result module 906 can send the location re-rank 908 and the route re-rank 910 as the relative re-ranking 534 of FIG. 5 to the display result module 532.

The physical transformation from extrapolating the relative re-ranking 534 for unknown regions in a current time using past information and current information of known regions as well as for a future time results in movement in the physical world, such as people using the first device 102 of FIG. 1, the first device 402 of FIG. 4, vehicles, or the combination thereof, based on the operation of the navigation system 500. As the movement in the physical world occurs, the movement itself creates additional information that is converted back to the route re-rank 910, current information, and as user generated content for the continued operation of the navigation system 500 and to continue the movement in the physical world.

Figure 10:
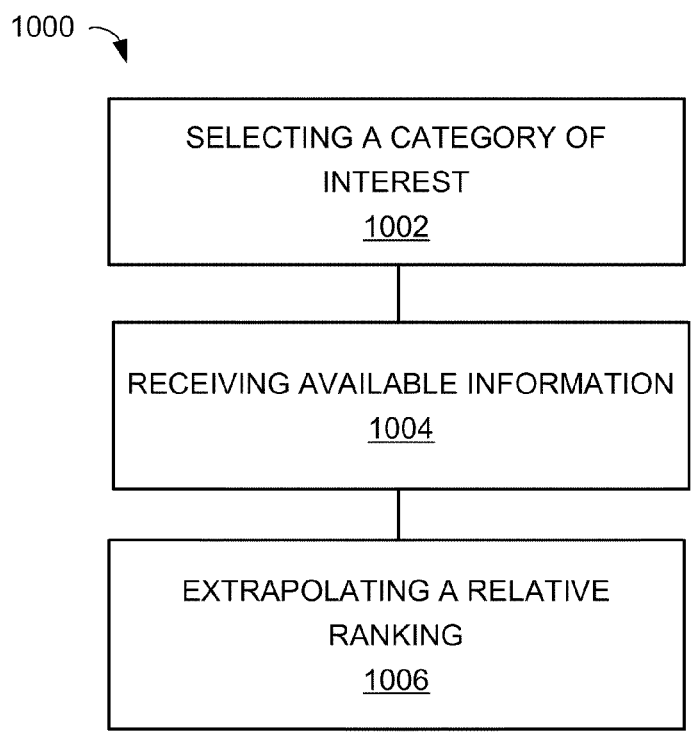
FIG. 10 is a flow chart of a method of operation of a navigation system in a further embodiment of the present invention.

Referring now to FIG. 10, therein is shown a flow chart of a method 1000 of operation of a navigation system in a further embodiment of the present invention. The method 1000 includes: selecting a category of interest in a block 1002; receiving available information for the category of interest in a block 1004; and extrapolating a relative ranking based on the available information for displaying at a device in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    selecting a category of interest;
    receiving available information for the category of interest;
    generating a trend for price information along a route based on the available information; and
    extrapolating a relative ranking based on the trend with a control unit for an unknown region lacking all or partial data in the available information for displaying at a device.

2. The method as claimed in claim 1 further comprising:
    selecting a future time of interest; and
    wherein extrapolating the relative ranking based on the available information includes:
    generating the relative ranking for the future time of interest based on the available information.

3. The method as claimed in claim 1 further comprising:
    selecting an unknown region lacking all or partial data in the available information; and
    wherein extrapolating the relative ranking based on the available information includes:
    estimating the relative ranking for the unknown region based on the available information.

4. The method as claimed in claim 1 further comprising:
    selecting a future time of interest; and
    wherein extrapolating the relative ranking based on the available information includes:
    generating the relative ranking for the future time of interest based on the available information;
    generating an updated version of the available information based on a user generated content for the relative ranking; and improving an accuracy of the relative ranking based on the updated version.

5. The method as claimed in claim 1 further comprising:
selecting an unknown region lacking all or partial data in the available information; and
wherein extrapolating the relative ranking based on the available information includes:
estimating the relative ranking for the unknown region based on the available information;
generating an updated version of the available information based on a user generated content for the relative ranking at a known region, the unknown region, or a combination thereof; and
improving an accuracy of the relative ranking based on the updated version.

6. A method of operation of a navigation system comprising:
selecting a category of interest;
receiving available information for the category of interest with the available information including current data, historical data, user generated content, or the combination thereof;
selecting an unknown region lacking all or partial data in the available information;
generating a trend for price information along a route based on the available information; and
extrapolating a relative ranking based on the trend for the unknown region with a control unit for displaying at a device.

7. The method as claimed in claim 6 wherein:
extrapolating the relative ranking includes selecting a region; and
further comprising:
re-ranking the relative ranking based on the region.

8. The method as claimed in claim 6 wherein:
extrapolating the relative ranking includes selecting the route;
detecting a current location along the route; and
further comprising:
re-ranking the relative ranking based on the current location.

9. The method as claimed in claim 6 further comprising:
selecting the route; and
wherein extrapolating the relative ranking based on the available information with the future time of interest or the unknown region includes:
generating an updated version of the available information based on the user generated content along the route; and
improving an accuracy of the relative ranking for the route based on the updated version.

10. The method as claimed in claim 6 wherein extrapolating the relative ranking based on the available information includes:
selecting the route or a region; and
generating the trend based on the available information for the route or the region.

11. A navigation system comprising:
a user interface for selecting a category of interest;
a storage unit, coupled to the user interface, for receiving available information for the category of interest; and
a control unit, coupled to the storage unit, for:
generating a trend for price information along a route based on the available information, and
extrapolating a relative ranking based on the trend for an unknown region lacking all or partial data in the available information for displaying at a device.

12. The system as claimed in claim 11 wherein:
the user interface is for selecting a future time of interest; and
the control unit is for generating the relative ranking based on the future time of interest and the available information.

13. The system as claimed in claim 11 wherein the control unit includes:
a select navigation module for selecting an unknown region lacking all or partial data in the available information; and
an extrapolation module for estimating the relative ranking for the unknown region based on the available information.

14. The system as claimed in claim 11 wherein:
the user interface includes:
a user input module for selecting a future time of interest,
an available information module for entering a user generated content; and
the control unit includes:
an extrapolation module for generating the relative ranking based on the future time of interest and the available information,
an available information module for generating an updated version of the available information based on the user generated content for the relative ranking, and
an update result module for improving an accuracy of the relative ranking based on the updated version.

15. The system as claimed in claim 11 wherein the control unit includes:
a select navigation module for selecting an unknown region lacking all or partial data in the available information;
an extrapolation module for estimating the relative ranking for the unknown region based on the available information;
an available information module for generating an updated version of the available information based on a user generated content for the relative ranking at a known region, the unknown region, or a combination thereof; and
an update result module for improving an accuracy of the relative ranking based on the updated version.

16. The system as claimed in claim 11 further comprising:
the storage unit is for receiving available information including current data, historical data, user generated content, or the combination thereof;
the user interface is for selecting a future time of interest, an unknown region, or a combination thereof; and
the control unit is for extrapolating the relative ranking based on the available information with the future time of interest or the unknown region.

17. The system as claimed in claim 16 wherein the control unit includes:
a select navigation module for selecting a region; and
a re-ranking module for re-ranking the relative ranking based on the region.

18. The system as claimed in claim 16 further comprising:
a location unit for detecting a current location; and
wherein the control unit includes:
a select navigation module for selecting the route that includes the current location; and
a re-ranking module for re-ranking the relative ranking based on the current location.

19. The system as claimed in claim 16 wherein the control unit includes:
- a select navigation module for selecting the route;
- an available information module for generating an updated version of the available information based on the user generated content along the route; and
- an update result module for improving an accuracy of the relative ranking for the route based on the updated version.

20. The system as claimed in claim 16 wherein the control unit includes:
- a select navigation module for selecting the route or a region; and
- an extrapolation module for generating the trend based on the available information for the route or the region.

* * * * *